J. D. SHOOTS.
Buckets for Chain Pumps.
No. 158,534. Patented Jan. 5, 1875.
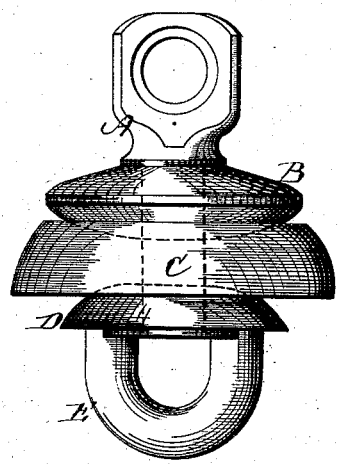
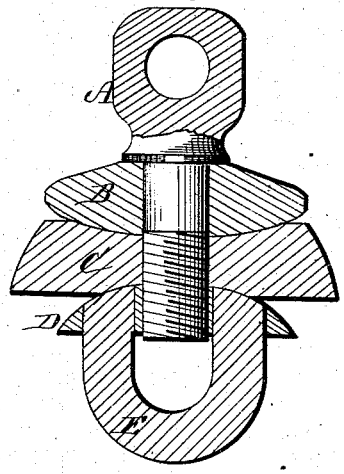
WITNESSES
Franck L. Ourand
C. L. Evert
INVENTOR
James D. Shoots
per
Alexander Mason
Attorneys.

UNITED STATES PATENT OFFICE.

JAMES D. SHOOTS, OF HORSEHEADS, NEW YORK, ASSIGNOR OF ONE-HALF HIS RIGHT TO ROBERT COLWELL, OF SAME PLACE.

IMPROVEMENT IN BUCKETS FOR CHAIN-PUMPS.

Specification forming part of Letters Patent No. 158,534, dated January 5, 1875; application filed November 12, 1874.

To all whom it may concern:

Be it known that I, JAMES D. SHOOTS, of Horseheads, in the county of Chemung and in the State of New York, have invented certain new and useful Improvements in Buckets for Chain-Pumps; and do hereby declare that the following is a full, clear, and exact description thereof, reference being had to the accompanying drawings, and to the letters of reference marked thereon, making a part of this specification.

The nature of my invention consists in the construction and arrangement of a bucket for chain-pumps, as will be hereinafter more fully set forth.

In order to enable others skilled in the art to which my invention appertains to make and use the same, I will now proceed to describe its construction and operation, referring to the annexed drawing, in which—

Figure 1 is a side view of my chain-pump bucket. Fig. 2 is a longitudinal section of the same.

A represents a ringed bolt or eyebolt, which is passed through a plate, B, rubber disk C, and plate D, the plate D being provided with female screw-threads in its central opening, to be screwed up on the screw A. This plate D is provided with a wire loop or link, E, for connecting the buckets. Both plates B and D are convex on the surfaces adjoining the rubber disk, and this disk is made slightly concave on both sides. The convexity of the plate, as well as the concavities of the rubber disk, causes the disk to expand by slightly compressing the plates, which is done simply by screwing up the plate D. The rubber disk is made with beveled edges, as shown.

I am aware that a chain-pump bucket composed of a rubber disk clamped between two metal plates is not new, and I do, therefore, not claim such, broadly, as my invention.

Having thus fully described my invention, what I claim as new, and desire to secure by Letters Patent, is—

The combination of the ring A with depending screw, the convex plate B, the rubber disk C, concave on both faces and inclined on its periphery, the plate D, with convex surface, and the loop E, all substantially as set forth.

In testimony that I claim the foregoing I have hereunto set my hand this 31st day of October, 1874.

JAMES D. SHOOTS.

Witnesses:
 FRANK B. CLARK,
 JOHN S. BOWMAN.